(12) United States Patent
Leung et al.

(10) Patent No.: US 8,379,677 B2
(45) Date of Patent: Feb. 19, 2013

(54) SYSTEM FOR COMBINING A PLURALITY OF VIDEO STREAMS AND METHOD FOR USE THEREWITH

(75) Inventors: Lewis Leung, Markham (CA); Krzysztof Socha, Mississauga (CA)

(73) Assignee: ViXS Systems, Inc., Toronto, Ontario (CA)

( * ) Notice: Subject to any disclaimer, the term of this patent is extended or adjusted under 35 U.S.C. 154(b) by 367 days.

(21) Appl. No.: 11/799,101

(22) Filed: Apr. 30, 2007

(65) Prior Publication Data

US 2008/0267222 A1   Oct. 30, 2008

(51) Int. Cl.
*H04J 3/04* (2006.01)
(52) U.S. Cl. ........................................ 370/535; 370/503
(58) Field of Classification Search .............. 375/240.12, 375/240.25; 382/232; 725/105; 348/443; 715/723; 370/535, 503
See application file for complete search history.

(56) References Cited

U.S. PATENT DOCUMENTS

| | | | | |
|---|---|---|---|---|
| 5,359,712 A | * | 10/1994 | Cohen et al. | 715/723 |
| 5,894,328 A | * | 4/1999 | Negishi | 375/240.25 |
| 6,308,222 B1 | | 10/2001 | Krueger et al. | |
| 6,611,624 B1 | * | 8/2003 | Zhang et al. | 382/232 |
| 7,068,719 B2 | * | 6/2006 | Liu et al. | 375/240.12 |
| 7,139,017 B2 | * | 11/2006 | Ali et al. | 348/192 |
| 7,143,432 B1 | * | 11/2006 | Brooks et al. | 725/105 |
| 2005/0057687 A1 | * | 3/2005 | Irani et al. | 348/443 |

FOREIGN PATENT DOCUMENTS

| | | |
|---|---|---|
| EP | 1021048 | 7/2000 |
| JP | 2003-529991 A | 10/2003 |
| WO | 01/75888 A1 | 10/2001 |
| WO | 02/100110 A2 | 12/2002 |
| WO | 02100110 A | 12/2002 |

OTHER PUBLICATIONS

CN OA; Notice of Reasons for Rejection, CN Application No. 2008-118562; May 15, 2012; 19 pages.

* cited by examiner

*Primary Examiner* — Mark Rinehart
*Assistant Examiner* — Gbemileke Onamuti
(74) *Attorney, Agent, or Firm* — Garlick & Markison; Bruce E. Stuckman (57) ABSTRACT

A system for combining a plurality of video streams includes a time stamp adjustment module that generates an adjusted second video stream by adjusting a plurality of time stamps of a second video stream. A video stream concatenation module generates a combined video stream by concatenating the adjusted second video stream to an end of a first video stream.

17 Claims, 13 Drawing Sheets

SYSTEM FOR COMBINING A PLURALITY OF VIDEO STREAMS AND METHOD FOR USE THEREWITH

TECHNICAL FIELD OF THE INVENTION

The present invention relates to encoding used in devices such as video encoders/codecs.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). While this standard sets forth many powerful techniques, its contemplates the encoding of a single video stream.

Further limitations and disadvantages of conventional and traditional approaches will become apparent to one of ordinary skill in the art through comparison of such systems with the present invention.

DETAILED DESCRIPTION OF THE INVENTION INCLUDING THE PRESENTLY PREFERRED EMBODIMENTS

Figure 1:
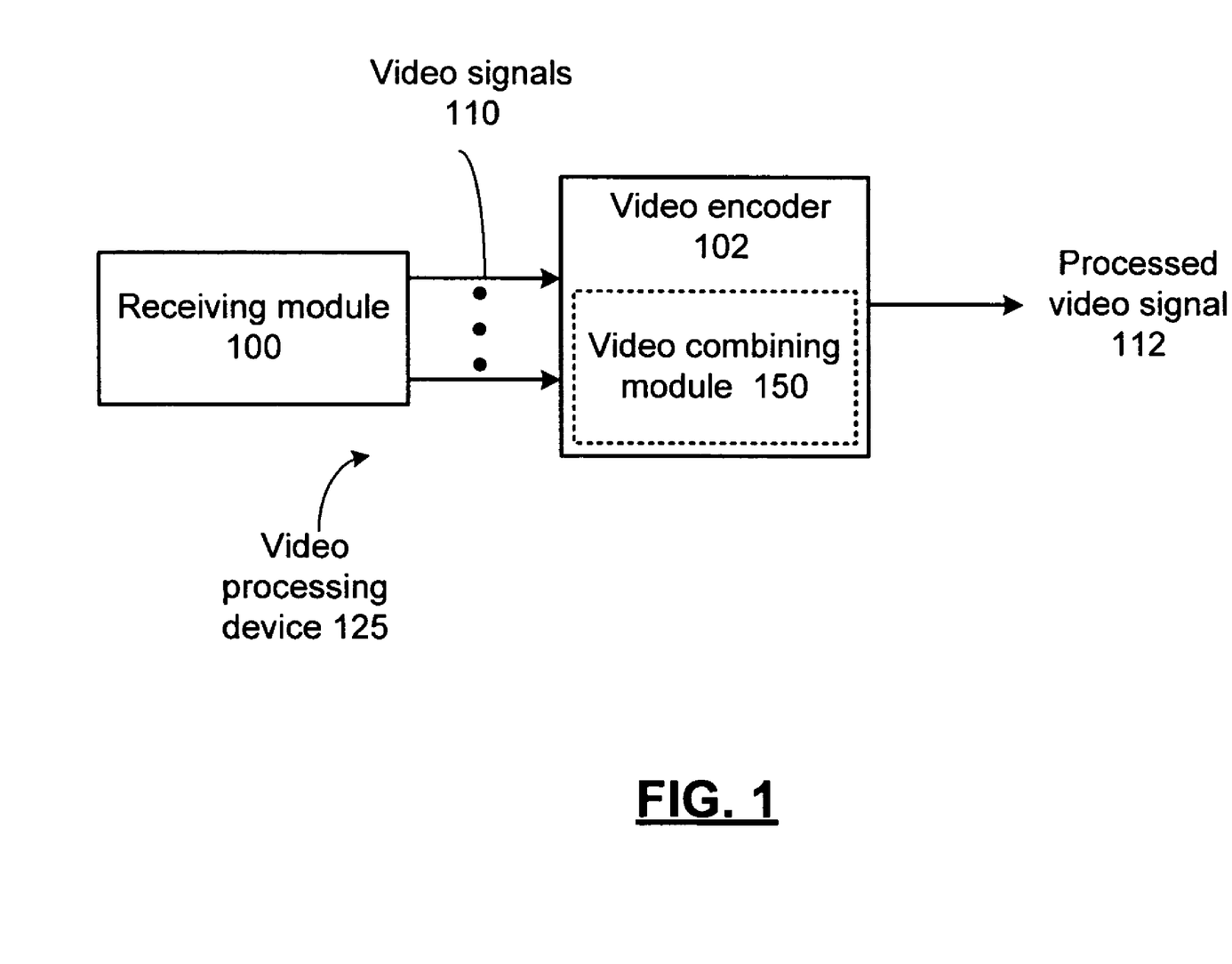
FIG. 1 presents a block diagram representation of a video processing device 125 in accordance with an embodiment of the present invention.

FIG. 1 presents a block diagram representation of a video processing device 125 in accordance with an embodiment of the present invention. In particular, video processing device 125 includes a receiving module 100, such as a set-top box, television receiver, personal computer, cable television receiver, satellite broadcast receiver, broadband modem, 3G transceiver or other information receiver or transceiver that is capable of receiving a plurality of video signals 110 from one or more sources such as a broadcast cable system, a broadcast satellite system, the Internet, a digital video disc player, a digital video recorder, or other video source. Video encoding module 102 is coupled to the receiving module 100 to encode, transrate and/or transcode the video signals 110 and to combine two or more of the video signals 110 to form processed video signal 112.

In an embodiment of the present invention, the video signals 110 can include a broadcast video signal, such as a television signal, high definition televisions signal, enhanced high definition television signal or other broadcast video signal that has been transmitted over a wireless medium, either directly or through one or more satellites or other relay stations or through a cable network, optical network or other transmission network. In addition, the video signals 110 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can include an analog video signal that is formatted in any of a number of video formats including National Television Systems Committee (NTSC), Phase Alternating Line (PAL) or Sequentiel Couleur Avec Memoire (SECAM). Processed video signal includes 112 a digital video codec standard such as H.264, MPEG-4 Part 10 Advanced Video Coding (AVC) or other digital format such as a Motion Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary.

The video combining module 150 includes many optional functions and features described in conjunction with FIGS. 2-12 that follow.

Figure 2:
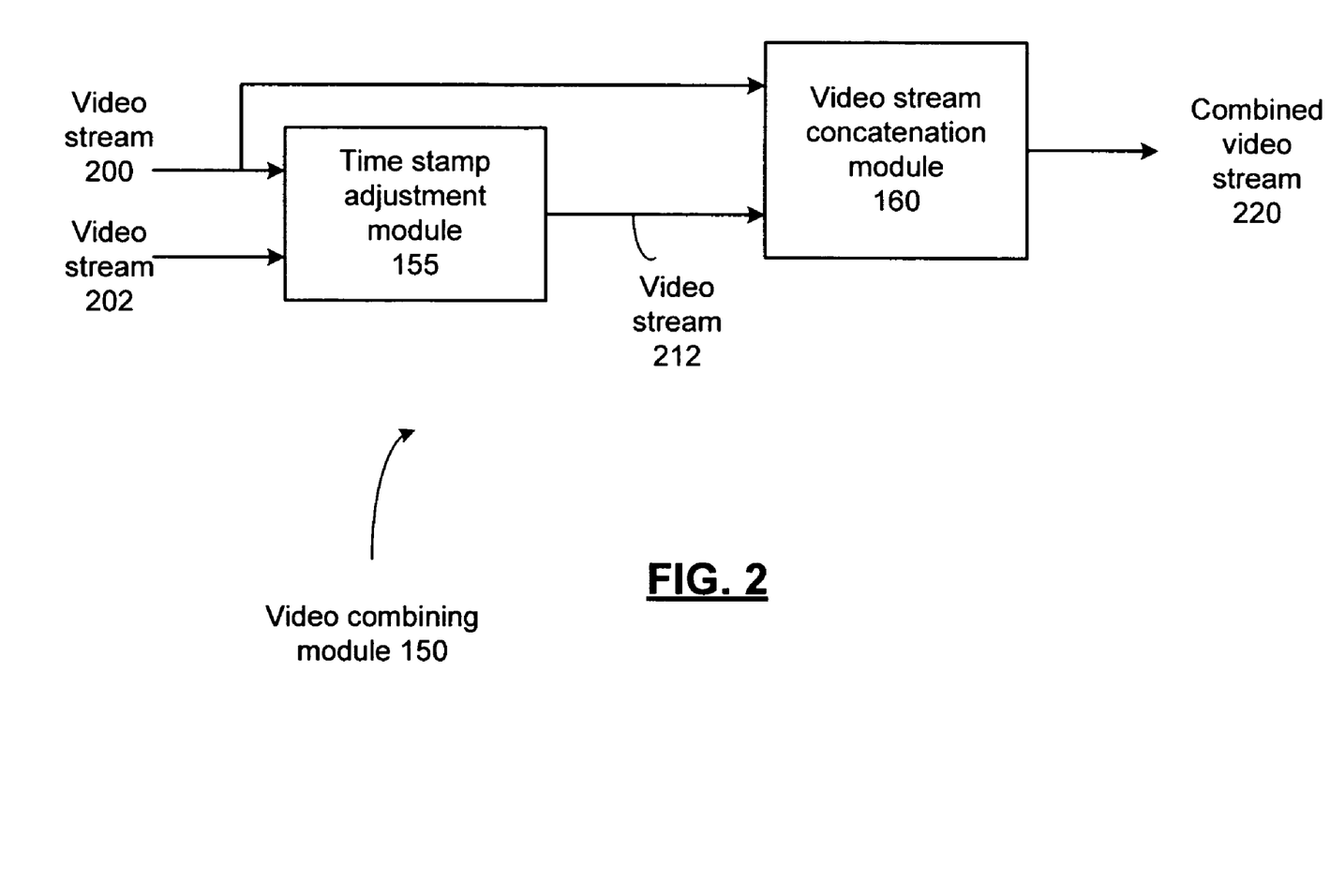
FIG. 2 presents a block diagram representation of a video combining module 150 in accordance with an embodiment of the present invention.

FIG. 2 presents a block diagram representation of a video combining module 150 in accordance with an embodiment of the present invention. In particular, a video combining module 150 is presented for combining a plurality of digital video streams, such as from video signals 110, including a video stream 200 and a video stream 202. In this embodiment video combining module 150 includes a time stamp adjustment module 155 and video stream concatenation module 160 that operate as follows.

Time stamp adjustment module 155 generates an adjusted video stream 212 by adjusting a plurality of time stamps of the video stream 202. Video stream concatenation module 160 generates a combined video stream 220 by concatenating the adjusted video stream 212 to an end of the video stream 200.

In an embodiment of the present invention, video streams 200 and 202 include associated audio programming. Each video frame includes a presentation time stamp (PTS) that can be retrieved directly from the packetized elementary stream (PES) layer of the incoming program stream or calculated based on the PES layer from the previous frame timestamp. Each audio frame also has a PTS that can be retrieved or calculated in a similar fashion. The video streams 200 and 202 also include a sequence of decode time stamps (DTS) that are used to control the decoding of the video streams in accordance with one or more video encoding standards. Video stream 202 can be concatenated to the end of video stream 200 if the system clock reference is contiguous, in particular, the PTS and DTS of video stream 202 are adjusted to be contiguous with the PTS and DTS of video stream 200.

The time stamp adjustment module 155 determines a time stamp difference, such as a time delta, based on at least one time stamp of the video stream 200 and at least one time stamp of the video stream 202, in order to adjust the plurality of time stamps of the video stream 202 by the time stamp difference. The time stamp adjustment module 155 determines the time stamp difference by determining a first difference between a presentation time stamp value for a last video frame of the video stream 200 and a presentation time stamp value for a first video frame of the video stream 202 and adding the first difference to a duration of the last video frame of the first video stream. Adjusting each the time stamps of the video stream 202 by the first difference allows the time stamp adjustment module 155 to produce video stream 212 with presentation time stamps and decode stamps that pick up where the presentation time stamp at the end of the video stream 200 left off. This allows video stream concatenation module 160 to produce a combined video stream 220 with timing as if the video stream 200 continued, but with the video frames of video stream 202.

In an embodiment of the present invention, the time stamp adjustment module 155 and video stream concatenation module are implemented in software that runs on a video encoder chip such as the XCode II MPEG encoder/video processor chip, however, other implementations including other hardware, software and firmware are likewise possible.

Figure 3:
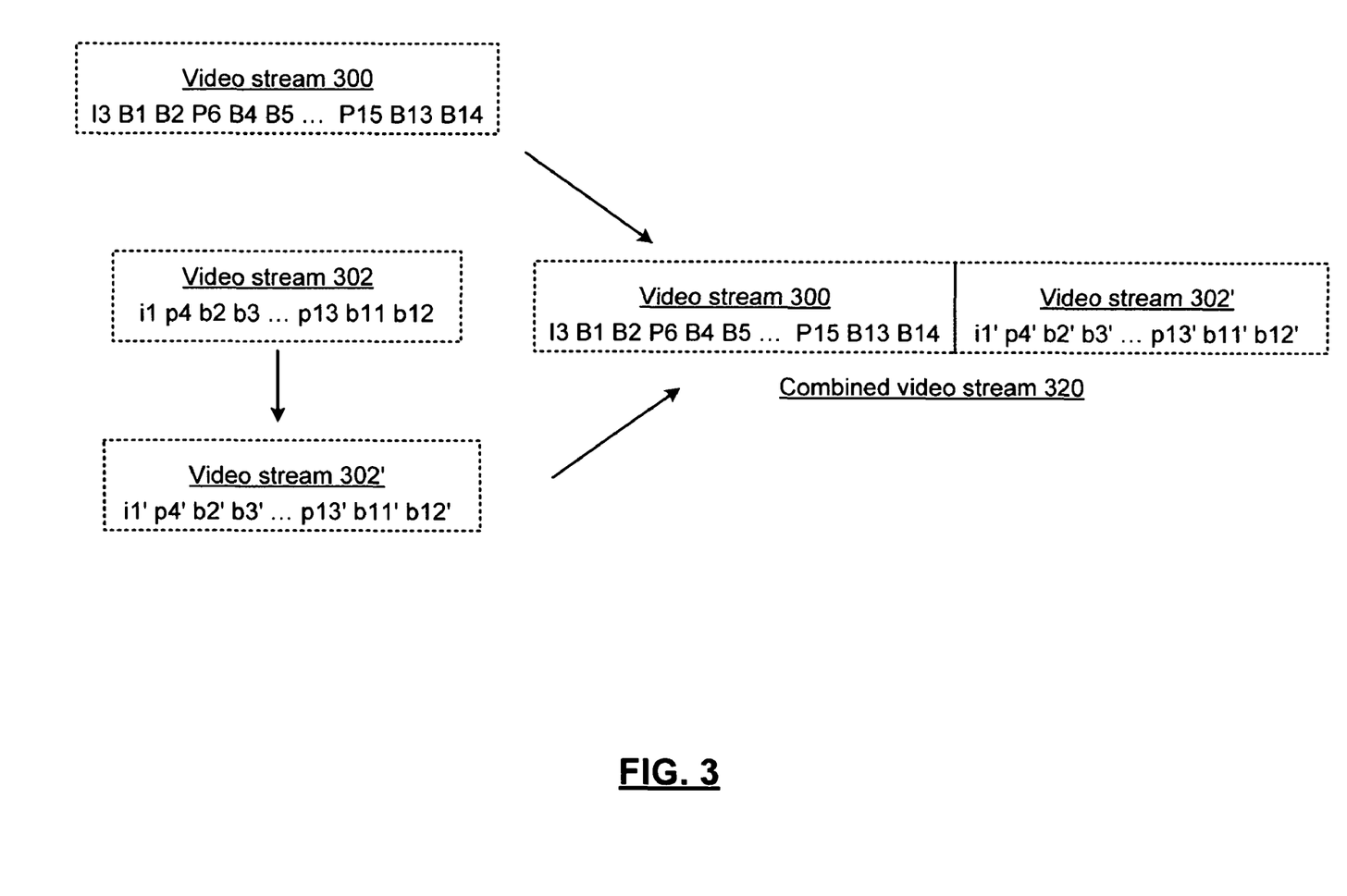
FIG. 3 presents a representation of an example of combining video streams 300 and 302 to form a combined video stream 320 in accordance with an embodiment of the present invention.

FIG. 3 presents a representation of an example of combining video streams 300 and 302 to form a combined video stream 320 in accordance with an embodiment of the present invention. In particular, an example is shown that includes a video stream 300, such as video stream 200, that has a plurality of pictures (denoted using capital letters) in the last group of pictures (GOP) of the video stream, that are presented in decode order. The first letter indicates the video frame type, corresponding to B-frames, I-frames, and P-frames of the video stream. The number indicates the display order of each picture. Video stream 302, such as video stream 202, is also presented showing the first GOP in a similar fashion, but with the pictures denoted by non-capital letters.

Video stream 302' is formed from video stream 302 by adjusting each of the time stamps by a time stamp difference that can be calculated as follows:

(new PTS/DTS of i1)=(PTS of P15)+(display duration of P15)

(time stamp difference)=(new PTS/DTS of i1)−(original PTS/DTS of i1)

The PTS/DTS of each of the pictures of video stream 302 can be adjusted by adding the time stamp difference to the original PTS/DTS, forming contiguous PTS/DTS in the combined video stream 320 when video stream 302' is concatenated to the end of video stream 300 as shown. For the corresponding audio frames, the adjustment is added to the PTS values.

As is evident, the process can be repeated by concatenating one or more additional video streams to the end of video stream 302'. Further, video stream 300 and video stream 302 may themselves by video streams that were previously concatenated in a similar fashion. In this fashion, the present invention can form a combined video stream 320 containing any arbitrary number of individual video streams.

As shown, the first video frame of the video stream 302 is an I-frame with a sequence header. If not, the frames prior to the I-Frame can be discarded. Similarly, all audio frames before the DTS of the first I frame display time can also be discarded to form a contiguous stream.

While, in this example, the combined video stream 320 is formed by adjusting the time stamps of video stream 302, in a similar fashion, the time stamps of video stream 300 can be adjusted to match the time stamps of video stream 302, so that when video stream 302 is concatenated to the end of video stream 300, the time stamps are also contiguous, with the first picture of video stream 302 having a time stamp that continues based on where the adjusted time stamp of video stream 300 left off.

Figure 4:
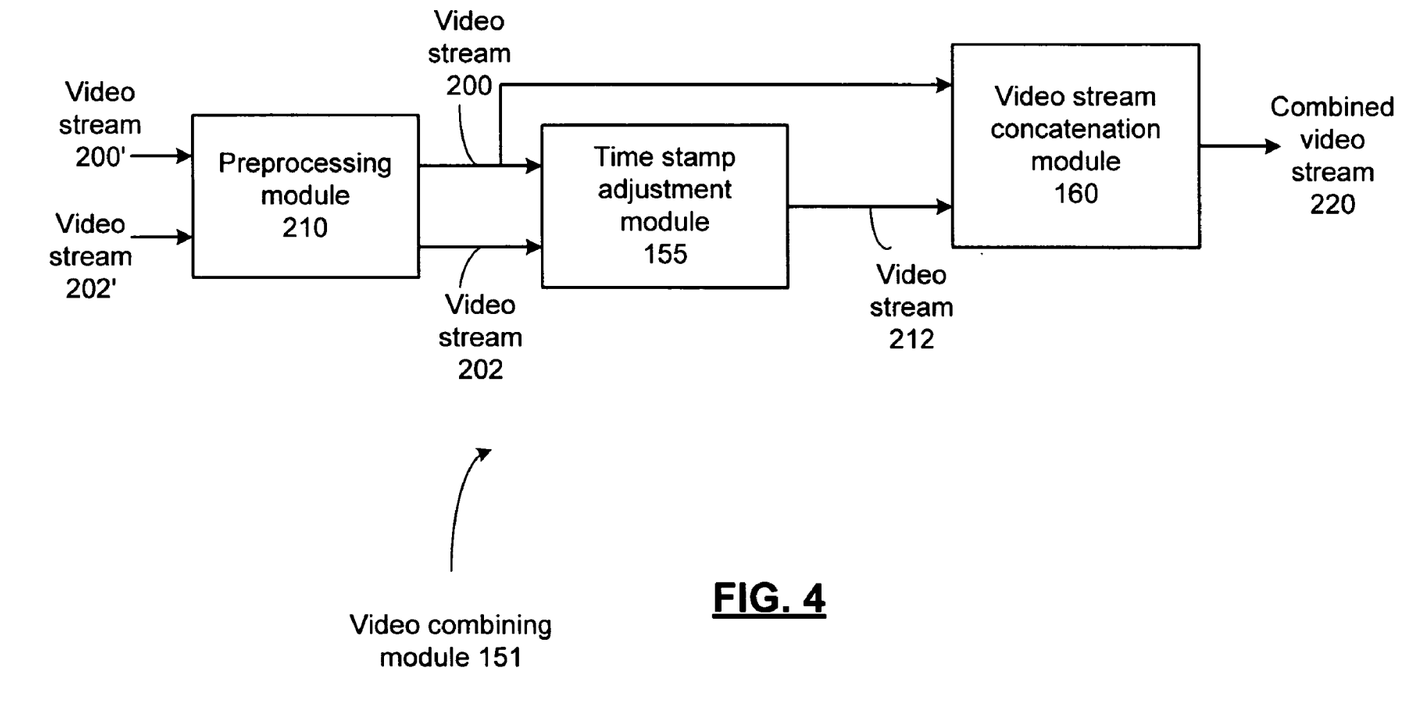
FIG. 4 presents a block diagram representation of a video combining module 151 in accordance with a further embodiment of the present invention.

FIG. 4 presents a block diagram representation of a video combining module 151 in accordance with a further embodiment of the present invention. This embodiment includes similar elements of video combining module 150 that are referred to by common reference numerals. In addition, processing module 210 preprocesses video streams 200' and 202' to form video streams 200 and 202.

In particular, preprocessing module 210 can adding padding at the end of video stream 200' to form video stream 200 to align the end of video stream 200'. For instance, for operation of the present invention in accordance with the DVD specification that defines a pack as 2048 bytes containing a pack header system header and data, preprocessing module 210 can insert padding bytes to generate a complete pack at the end of the video stream when the end of the first video stream does not correspond to a complete pack. Further, if there are additional audio frames at the end of the last frame of video of video team 200', these audio frames can be discarded by preprocessing module 210 in the formation of video stream 200.

In addition, if the video frame rates, video resolutions, audio sample rates and audio bit rates of video streams 200' and 202' are not equal, preprocessing module 210 can adjust the video frame rate, video resolution, audio sample rate and audio bit rate of one or another of the video streams by transrating and or transcoding to produce video streams 200 and 202 with an equal video frame rates, video resolutions, audio sample rates and audio bit rates. Further, preprocessing module determines if a first group of pictures of the second video stream is not a closed group of pictures and when the first group of pictures is not a closed group of pictures, preprocessing module 210 can discard the B frames before a P frame of the second group of pictures to produce a smooth transition.

In an embodiment of the present invention, preprocessing module 210 can be implemented using a single processing device or a plurality of processing devices. Such a processing device may be a microprocessor, co-processors, a microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, that may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the preprocessing module 210 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Figure 5:
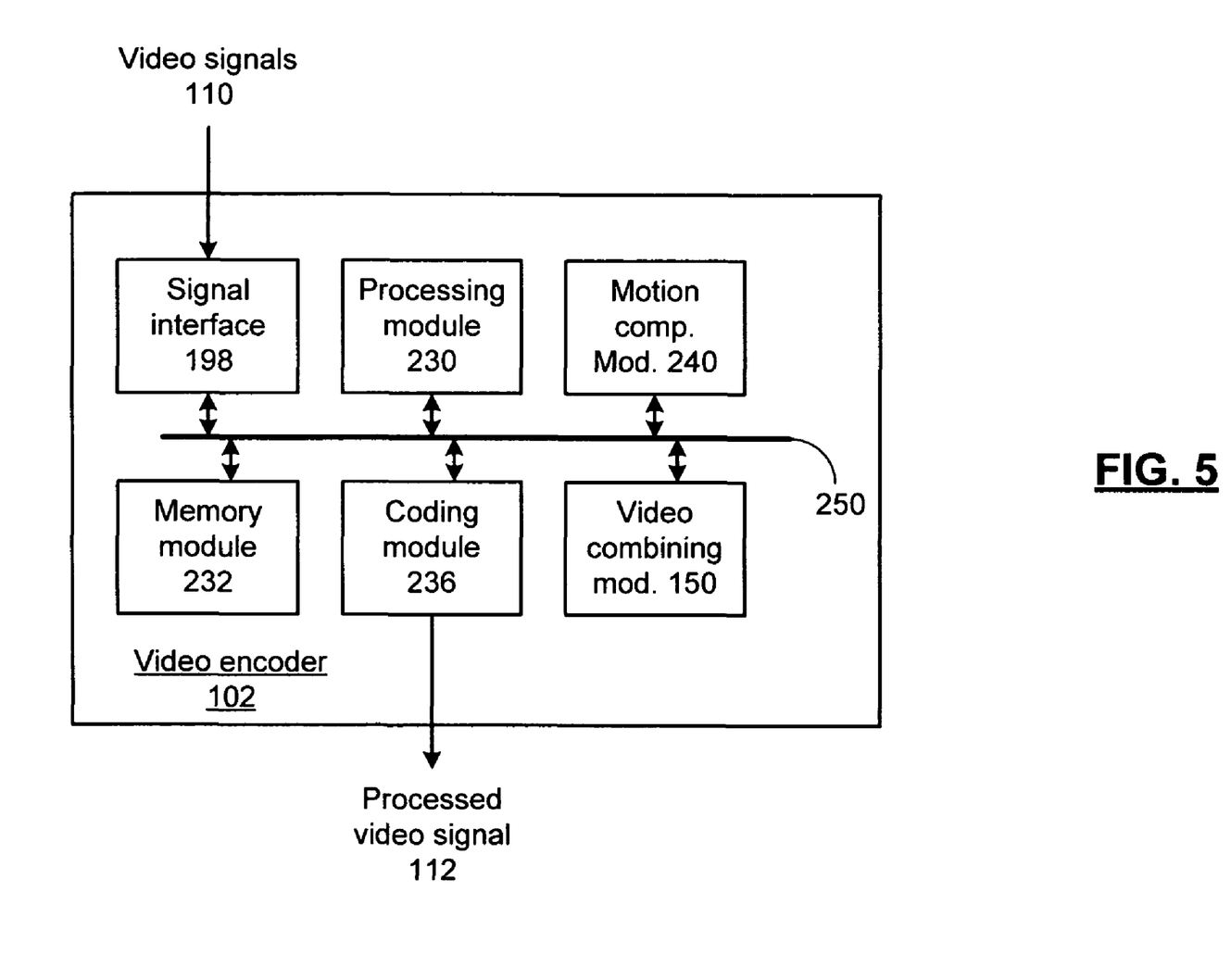
FIG. 5 presents a block diagram representation of a video encoder 102 in accordance with an embodiment of the present invention.

FIG. 5 presents a block diagram representation of a video encoder 102 in accordance with an embodiment of the present invention. In particular, video encoder 102 operates in accordance with many of the functions and features of the H.264 standard, the MPEG-4 standard, VC-1 (SMPTE standard 421M) or other standard, to encode, transrate or transcode video input signals 110 that are received via a signal interface 198.

The video encoder 102 includes a processing module 230 that can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 202 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 230, and memory module 232 are coupled, via bus 250, to the signal interface 198 and a plurality of other modules, such as video combining module 150, motion compensation module 234 and coding module 236. The modules of video encoder 102 can be implemented in software, firmware or hardware, depending on the particular implementation of processing module 200. It should also be noted that the software implementations of the present invention can be stored on a tangible storage medium such as a magnetic or optical disk, read-only memory or random access memory and also be produced as an article of manufacture. While a particular bus architecture is shown, alternative architectures using direct connectivity between one or more modules. and/or additional busses can likewise be implemented in accordance with the present invention.

In operation, motion compensation module 234 and coding module 236 operate to produce a compressed video stream based on either a single video stream of video signals 110 or a combined video stream such as combined video stream 220. Motion compensation module 234 operates in a plurality of macroblocks of each frame or field of the video stream generating residual luma and/or chroma pixel values corresponding to the final motion vector for each macroblock. Coding module 236 generates processed video signal 112 by transforming coding and quantizing the residual pixel values into quantized transformed coefficients that can be further coded, such as by entropy coding in entropy coding, filtered by a de-blocking filter and transmitted and/or stored as the processed video signal 112. In a transcoding application where digital video streams are received by the encoder 102 the incoming video signals can be combined prior to further encoding, transrating or transcoding. Alternatively, two or more encoded, transrated or transcoded video streams can be combined using the present invention as described herein.

Figure 6:
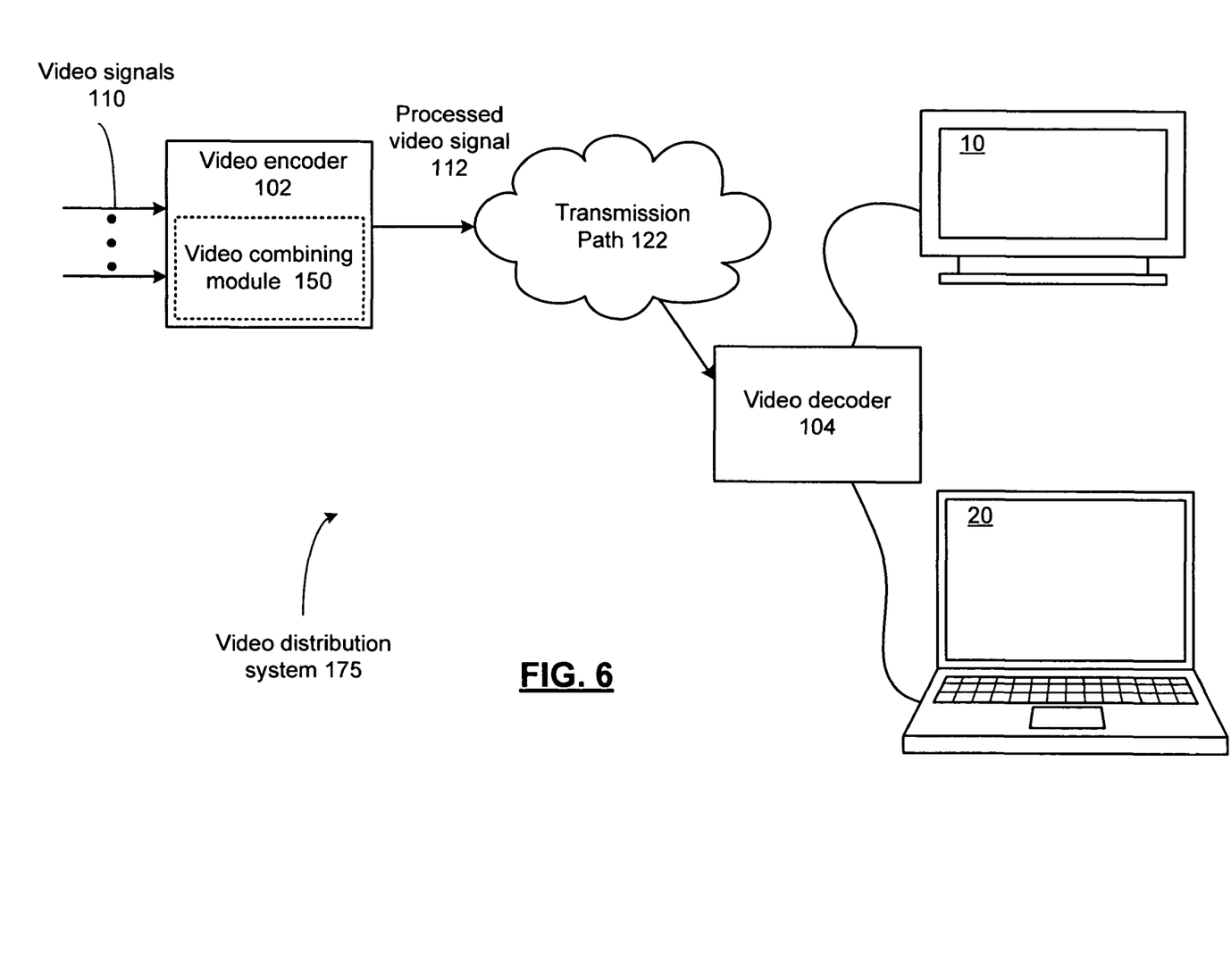
FIG. 6 presents a block diagram representation of a video distribution system 175 in accordance with an embodiment of the present invention.

FIG. 6 presents a block diagram representation of a video distribution system 175 in accordance with an embodiment of the present invention. In particular, processed video signal 112, containing combined video stream. 220, is transmitted via a transmission path 122 to a video decoder 104. Video decoder 104, in turn can operate to decode the processed video signal for display on a display device such as television 10, computer 20 or other display device, or an alternatively operate in an inverse fashion to video encoder 102 to separate the combined video stream 220 into separate video streams.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 7:
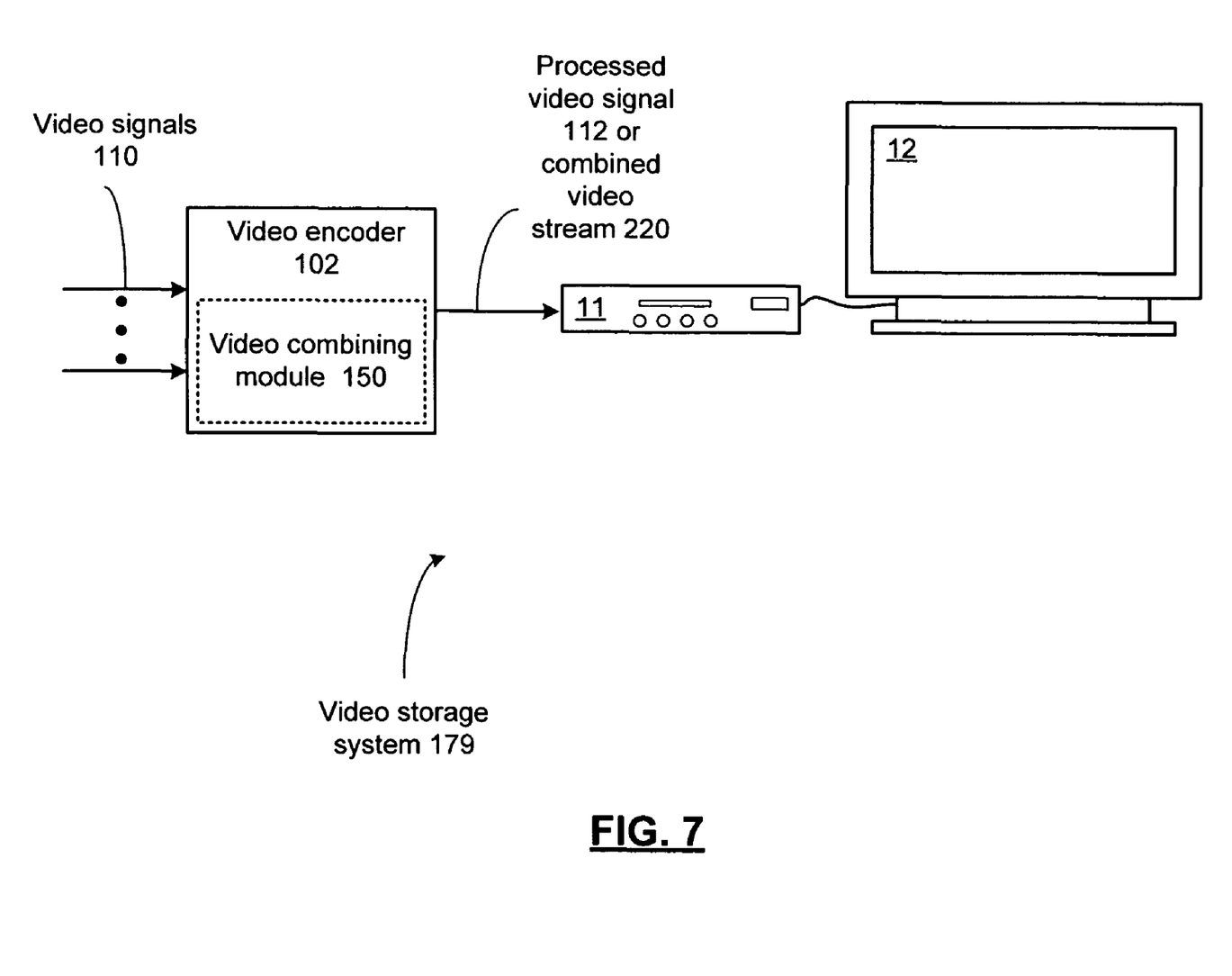
FIG. 7 presents a block diagram representation of a video storage system 179 in accordance with an embodiment of the present invention.

FIG. 7 presents a block diagram representation of a video storage system 179 in accordance with an embodiment of the present invention. In particular, device 11 is a set top box with built-in digital video recorder functionality, a stand alone digital video recorder, a DVD recorder/player or other device that stores the processed video signal 112 or the combined video stream 220, for display on video display device such as television 12. While video encoder 102 is shown as a separate device, it can further be incorporated into device 11. While these particular devices are illustrated, video storage system 179 can include a hard drive, flash memory device, computer, DVD burner, or any other device that is capable of generating, storing, decoding and/or displaying the combined video stream 220 in accordance with the methods and systems described in conjunction with the features and functions of the present invention as described herein.

Figure 8:
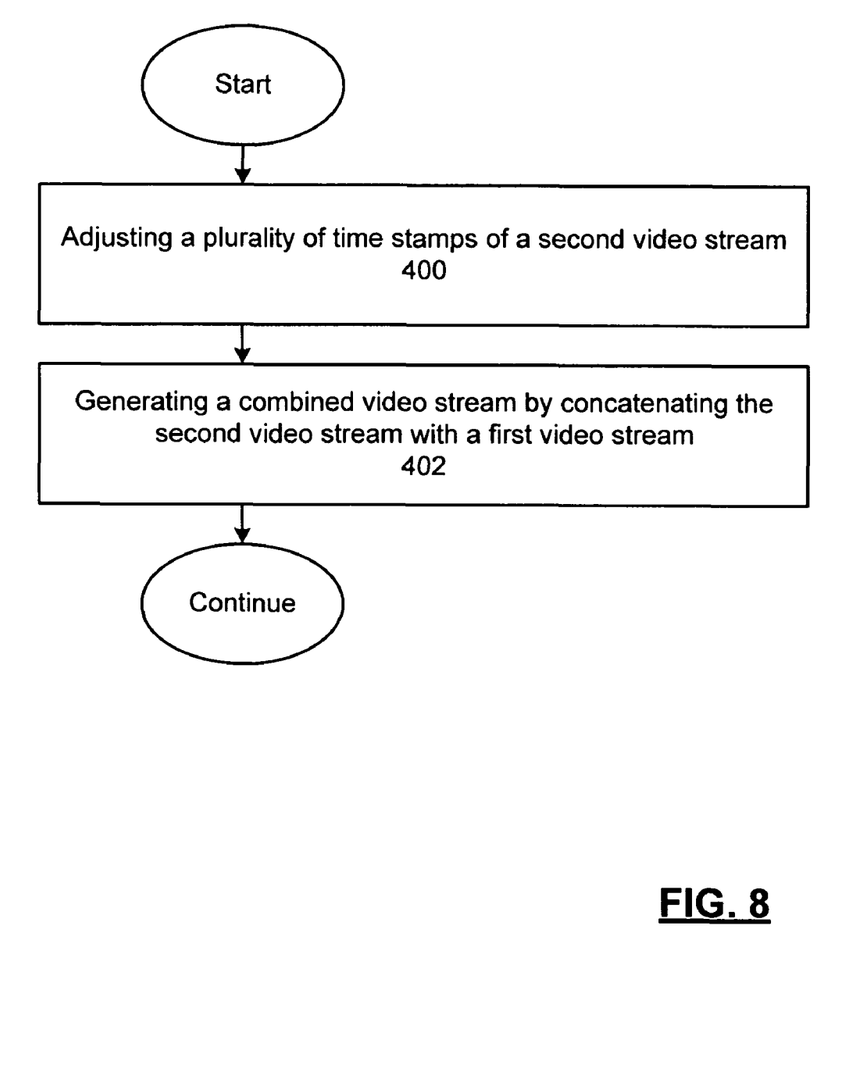
FIG. 8 presents a flowchart representation of a method in accordance with an embodiment of the present invention.

FIG. 8 presents a flowchart representation of a method in accordance with an embodiment of the present invention. In particular a method is presented for use in conjunction with one ore more functions and features described in conjunction with FIGS. 1-7 for combining first and second video streams. In step 400, a plurality of time stamps are adjusted of the second video stream. In step 402, a combined video stream is generated by concatenating the second video stream to an end of the first video stream.

In an embodiment of the present invention, step 400 includes determining a time stamp difference based on at least one time stamp of the first video stream and at least one time stamp of the second video stream, and adjusting the plurality of time stamps of the second video stream by the time stamp difference. Step 400 can also include determining a first difference between a presentation time stamp value for a last video frame of the first video stream and a presentation time stamp value for a first video frame of the second video stream and adding the first difference to a duration of the last video frame of the first video stream. The first video frame of the second video stream can be an I frame, and in particular can be identified to begin with an I Frame. The plurality of time stamps of the second video stream can include a plurality of presentation time stamps and a plurality of decode time stamps.

Figure 9:
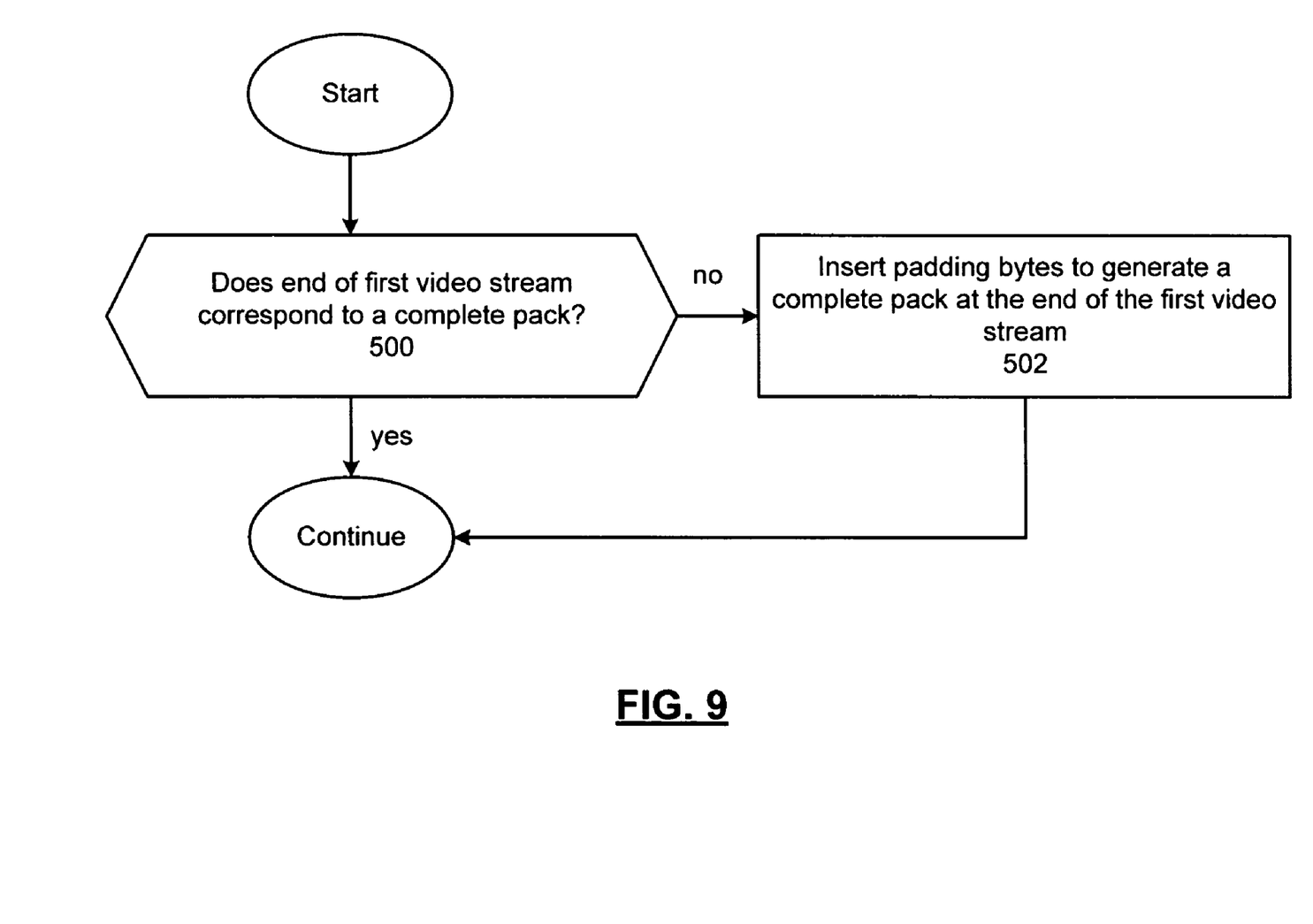
FIG. 9 presents a flowchart representation of a method in accordance with an embodiment of the present invention.

FIG. 9 presents a flowchart representation of a method in accordance with an embodiment of the present invention. In particular a method is presented for use in conjunction with the method described in association with FIG. 8. In step 500 the method determines if the end of the first video stream corresponds to a complete pack or is otherwise aligned. If not, inserting padding bytes are inserted to generate a complete pack at the end of the first video stream when the end of the first video stream does not correspond to a complete pack, as shown in step 502, before the method continues.

Figure 10:
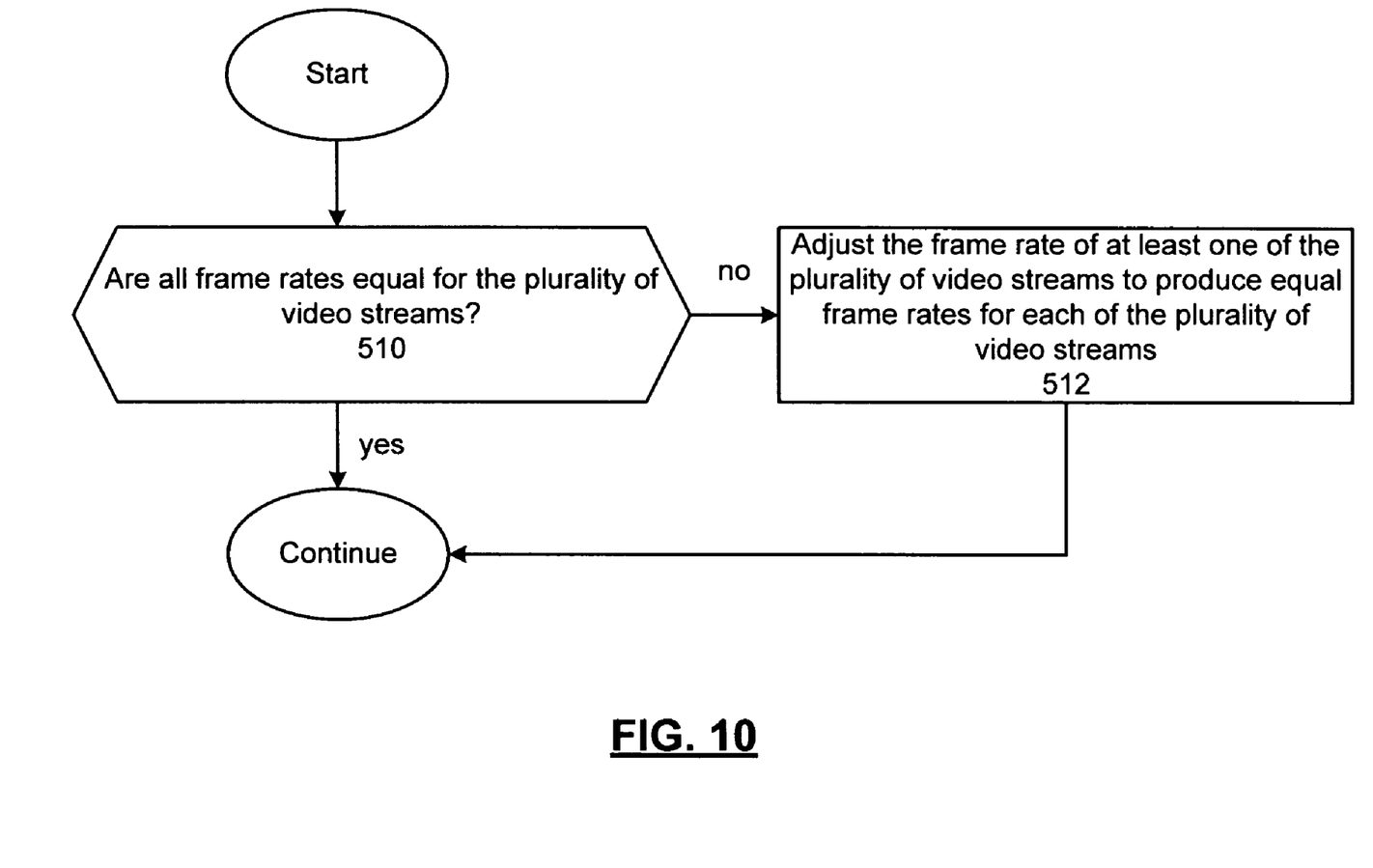
FIG. 10 presents a flowchart representation of a method in accordance with an embodiment of the present invention.

FIG. 10 presents a flowchart representation of a method in accordance with an embodiment of the present invention. In particular a method is presented for use in conjunction with the method described in association with FIG. 8. In step 510, the method determines if all frame rates are equal for the plurality of video streams. If not, the frame rate of at least one of the plurality of video streams is adjusted to produce an equal frame rate for each of the plurality of video streams, as shown in step 512, before the method continues.

Figure 11:
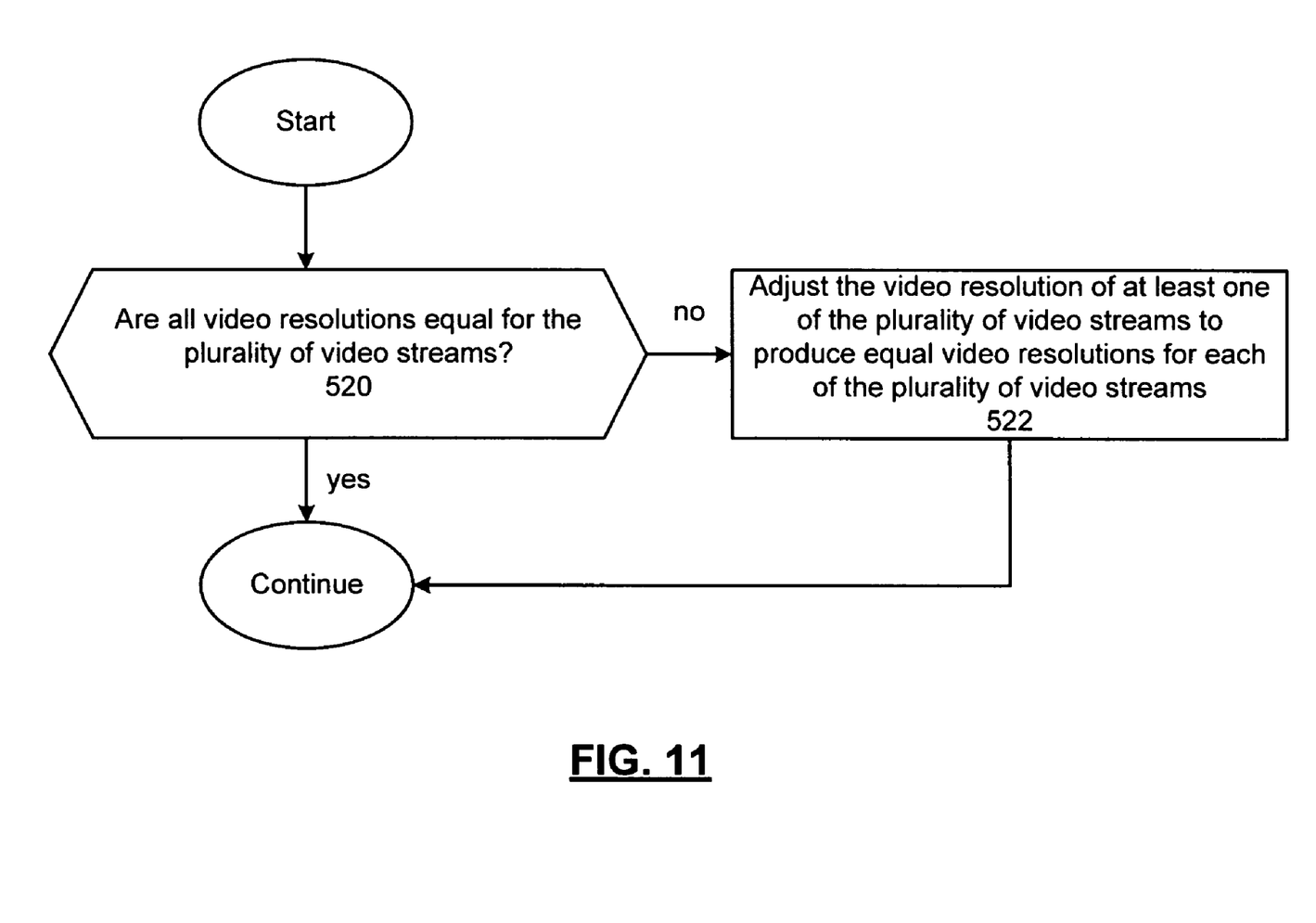
FIG. 11 presents a flowchart representation of a method in accordance with an embodiment of the present invention.

FIG. 11 presents a flowchart representation of a method in accordance with an embodiment of the present invention. In particular a method is presented for use in conjunction with the method described in association with FIG. 8. In step 520, the method determines if all video resolutions are equal for the plurality of video streams. If not, the video resolution of at least one of the plurality of video streams is adjusted to produce an equal video resolution for each of the plurality of video streams, as shown in step 522, before the method continues.

Figure 12:
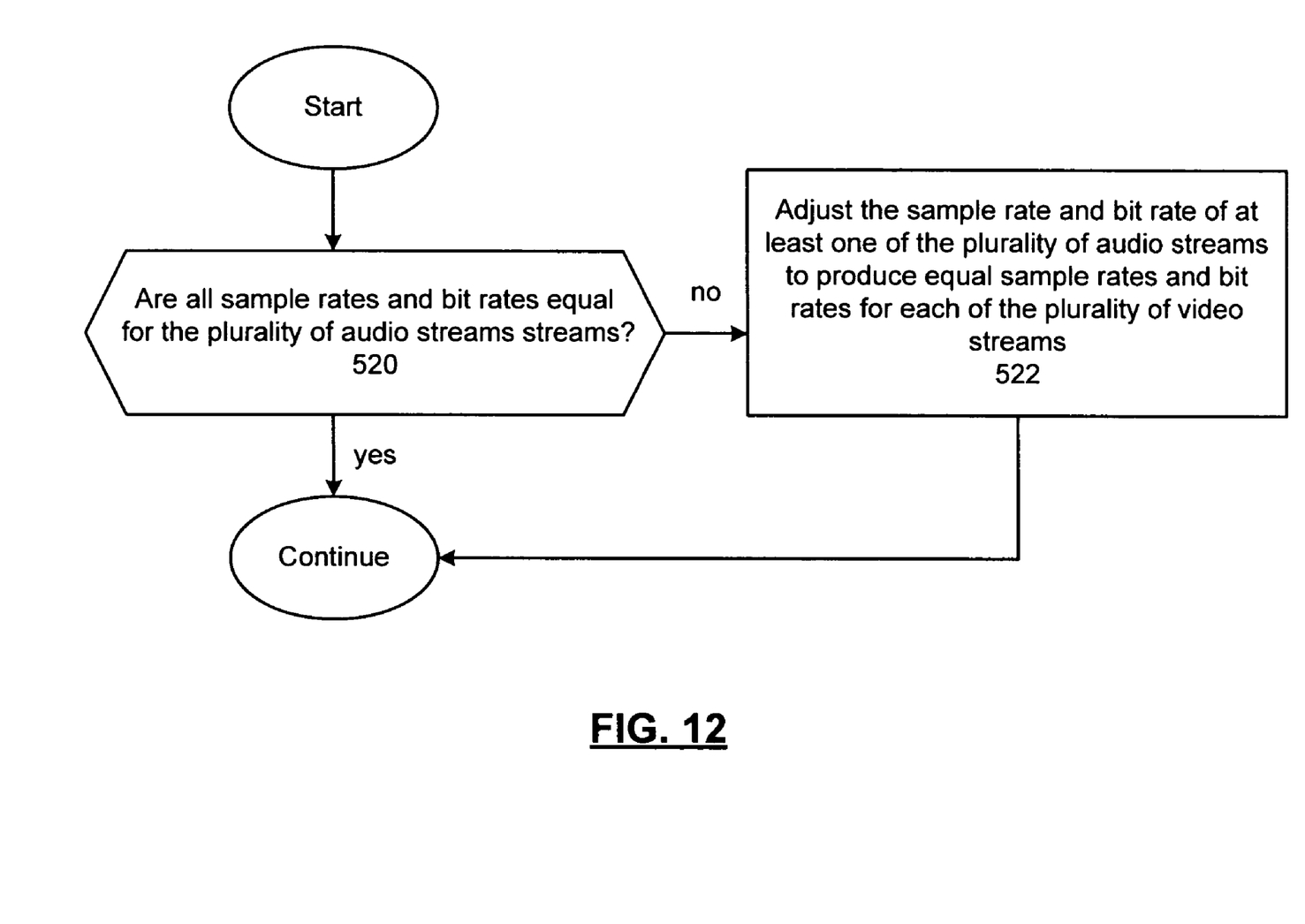
FIG. 12 presents a flowchart representation of a method in accordance with an embodiment of the present invention.

FIG. 12 presents a flowchart representation of a method in accordance with an embodiment of the present invention. In particular a method is presented for use in conjunction with the method described in conjunction with FIG. 8 wherein the plurality of video streams include a corresponding plurality of audio streams. In step 530, the method determines if all sample rates and bit rates are equal for the plurality of audio streams. If not, the sample rates and/or bit rates of at least one of the plurality of audio streams is adjusted to produce an equal sample rate and bit rate for each of the plurality of audio streams, as shown in step 532, before the method continues.

Figure 13:
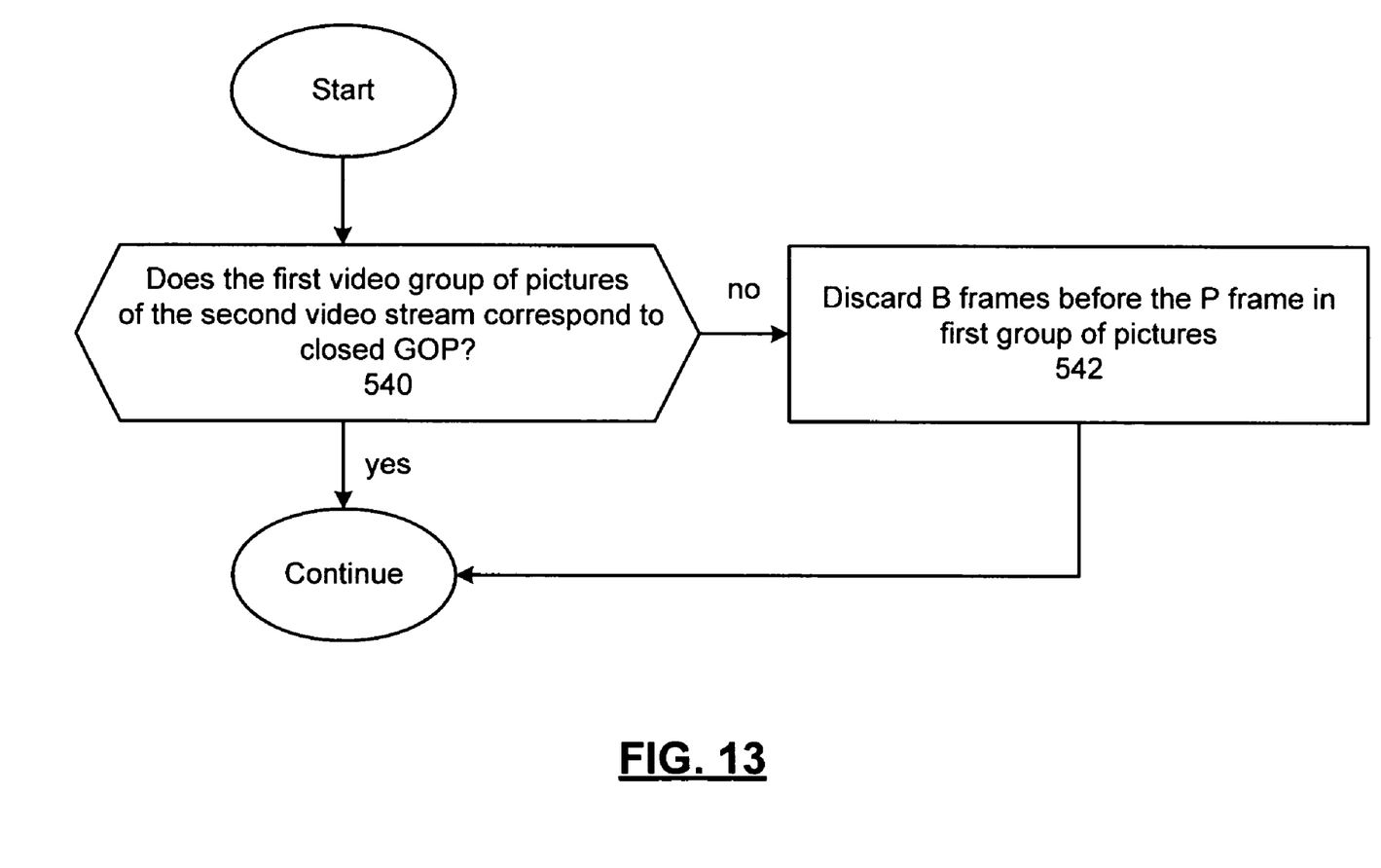
FIG. 13 presents a flowchart representation of a method in accordance with an embodiment of the present invention.

FIG. 13 presents a flowchart representation of a method in accordance with an embodiment of the present invention. In particular a method is presented for use in conjunction with the method described in conjunction with FIG. 8. In step 540, the method determines if a second group of pictures of the second video stream is not a closed group of pictures. When the second group of pictures is not a closed group of pictures, before continuing, a series of B frames are discarded before a P frame of the second group of pictures, as shown in step 542.

In preferred embodiments, the various circuit components are implemented using 0.35 micron or smaller CMOS technology. Provided however that other circuit technologies, both integrated or non-integrated, may be used within the broad scope of the present invention.

While particular combinations of various functions and features of the present invention have been expressly described herein, other combinations of these features and functions are possible that are not limited by the particular examples disclosed herein are expressly incorporated in within the scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a video encoder and video combining module for use therewith. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A system for combining a plurality of video streams including a first video stream and a second video stream, the system comprising:
   a preprocessing module that adjusts a video resolution of at least one of the plurality of video streams to produce an equal video resolution for each of the plurality of video streams;
   a time stamp adjustment module, coupled to the preprocessing module, that generates an adjusted second video stream by adjusting a plurality of time stamps of the second video stream; and
   a video stream concatenation module, coupled to the time stamp adjustment module, that generates a combined video stream by concatenating the adjusted second video stream to an end of the first video stream.

2. The system of claim 1 wherein the time stamp adjustment module is further operable to determine a time stamp difference based on at least one time stamp of the first video stream and at least one time stamp of the second video stream, and to adjust the plurality of time stamps of the second video stream by the time stamp difference.

3. The system of claim 2 wherein the time stamp adjustment module is further operable to determine a time stamp difference by determining a first difference between a presentation time stamp value for a last video frame of the first video stream and a presentation time stamp value for a first video frame of the second video stream and adding the first difference to a duration of the last video frame of the first video stream.

4. The system of claim 3 wherein the first video frame of the second video stream is an I frame.

5. The system of claim 1 wherein the plurality of time stamps of the second video stream include a plurality of presentation time stamps and a plurality of decode time stamps.

6. The system of claim 1 wherein the preprocessing module inserts padding bytes to generate a complete pack at the end of the first video stream when the end of the first video stream does not correspond to a complete pack.

7. The system of claim 1 wherein the preprocessing module adjusts a frame rates of at least one of the plurality of video streams to produce an equal frame rate for each of the plurality of video streams.

8. The system of claim 1 wherein the preprocessing module determines when a second group of pictures of the second video stream is not a closed group of pictures and when the second group of pictures is not a closed group of pictures, discarding a series of B frames before a P frame of the second group of pictures.

9. The system of claim 1 wherein the plurality of video streams include a corresponding plurality of audio streams and wherein the wherein the preprocessing module adjusts a sample rate and a bitrate of at least one of the plurality of audio streams to produce an equal sample rate and an equal bitrate for each of the plurality of video streams.

10. A method for combining a plurality of video streams including a first video stream and a second video stream, the method comprising:
receiving the first video stream and the second video stream;
adjusting a video resolution of at least one of the plurality of video streams to produce an equal video resolution for each of the plurality of video streams;
determining, via a video processing device, when an end of the first video stream does not correspond to a complete pack;
inserting, via a video processing device, padding bytes to generate a complete pack at the end of the first video stream when the end of the first video stream does not correspond to a complete pack;
adjusting a plurality of time stamps of the second video stream via a video processing device; and
generating a combined video stream via the video processing device by concatenating the first video stream and the second video stream.

11. The method of claim 10 wherein the step of adjusting the plurality of time stamps includes:
determining a time stamp difference based on at least one time stamp of the first video stream and at least one time stamp of the second video stream; and
adjusting the plurality of time stamps of the second video stream by the time stamp difference.

12. The method of claim 11 wherein the step of determining a time stamp difference includes determining a first difference between a presentation time stamp value for a last video frame of the first video stream and a presentation time stamp value for a first video frame of the second video stream and adding the first difference to a duration of the last video frame of the first video stream.

13. The method of claim 12 wherein the first video frame of the second video stream is an I frame.

14. The method of claim 10 wherein the plurality of time stamps of the second video stream include a plurality of presentation time stamps and a plurality of decode time stamps.

15. The method of claim 10 further comprising:
adjusting a frame rate of at least one of the plurality of video streams to produce an equal frame rate for each of the plurality of video streams.

16. The method of claim 10 wherein the plurality of video streams include a corresponding plurality of audio streams and wherein the method further comprises:
adjusting a sample rate and a bitrate of at least one of the plurality of audio streams to produce an equal sample rate and an equal bitrate for each of the plurality of video streams.

17. The method of claim 10 further comprising:
determining if a second group of pictures of the second video stream is not a closed group of pictures;
when the second group of pictures is not a closed group of pictures, discarding a series of B frames before a P frame of the second group of pictures.

* * * * *